(12) United States Patent
    Ebbenga

(10) Patent No.: US 12,686,335 B2
(45) Date of Patent: Jul. 21, 2026

(54) HORIZONTAL COLLAPSING LADDER

(71) Applicant: Mark Ebbenga, Shafer, MN (US)

(72) Inventor: Mark Ebbenga, Shafer, MN (US)

( * ) Notice: Subject to any disclaimer, the term of this patent is extended or adjusted under 35 U.S.C. 154(b) by 356 days.

(21) Appl. No.: 18/273,469

(22) PCT Filed: Jan. 4, 2022

(86) PCT No.: PCT/US2022/011086
    § 371 (c)(1),
    (2) Date: Jul. 20, 2023

(87) PCT Pub. No.: WO2022/159262
    PCT Pub. Date: Jul. 28, 2022

(65) Prior Publication Data
    US 2024/0101032 A1      Mar. 28, 2024

Related U.S. Application Data

(60) Provisional application No. 63/152,137, filed on Feb. 22, 2021, provisional application No. 63/139,968, filed on Jan. 21, 2021.

(51) Int. Cl.
    *B60R 3/02*        (2006.01)
    *B62D 65/02*       (2006.01)
               (Continued)

(52) U.S. Cl.
    CPC ................ *B60R 3/02* (2013.01); *B62D 65/02* (2013.01); *E06C 7/182* (2013.01); *E06C 7/50* (2013.01)

(58) Field of Classification Search
    CPC ... B60R 3/02; B60R 3/007; E06C 7/50; E06C 7/182; E06C 1/38; E06C 1/383; E06C 5/20
               (Continued)

(56) References Cited

U.S. PATENT DOCUMENTS

| | | | | | |
|---|---|---|---|---|---|
| 3,516,515 | A | * | 6/1970 | Clash | ..................... B60R 3/02 182/96 |
| 3,756,347 | A | * | 9/1973 | Messera | .................. E06C 1/383 182/95 |

(Continued)

FOREIGN PATENT DOCUMENTS

| | | |
|---|---|---|
| RU | 145987 U1 | 9/2014 |
| SU | 1207852 A | 1/1986 |

OTHER PUBLICATIONS

International Search Report issued for PCT Application No. PCT/US2022/011086, dated Apr. 21, 2022.

*Primary Examiner* — Brian E Glessner
(74) *Attorney, Agent, or Firm* — Westman, Champlin & Koehler, P.A.; Z. Peter Sawicki; Amanda M. Prose

(57)          ABSTRACT

A collapsible ladder assembly for mounting to a trailer comprises a ladder portion, a trailer mounting bracket, two extensible arms extending between connection with the ladder portion and connection with the trailer mounting bracket. The assembly has a first pivotal connection coupling the ladder portion to each of the two extensible arms a second pivotal connection coupling the ladder portion to each of the extensible arms, wherein an axis of the first pivotal connection is substantially normal to an axis of the second pivotal connection; and a third pivotal connection coupling each of the two extensible arms to the trailer mounting bracket.

17 Claims, 8 Drawing Sheets

(51) Int. Cl.
  *E06C 7/18*    (2006.01)
  *E06C 7/50*    (2006.01)

(58) Field of Classification Search
  USPC ..................................................... 182/96, 127
  See application file for complete search history.

(56)       References Cited

U.S. PATENT DOCUMENTS

| | | | | |
|---|---|---|---|---|
| 4,037,686 | A * | 7/1977 | Shull | E06C 9/085 |
| | | | | 182/160 |
| 5,397,143 | A * | 3/1995 | Bird | B60R 3/02 |
| | | | | 280/166 |
| 6,206,139 | B1 * | 3/2001 | Bogart, Jr. | E06C 1/39 |
| | | | | 182/96 |
| 8,186,763 | B2 * | 5/2012 | Kramer | E01C 23/088 |
| | | | | 182/127 |
| 8,931,792 | B1 * | 1/2015 | Klassen | B60R 3/02 |
| | | | | 182/67.4 |
| 2007/0000723 | A1 | 1/2007 | Jensen | |
| 2007/0029137 | A1 * | 2/2007 | Welsh | E06C 7/081 |
| | | | | 182/96 |
| 2009/0065301 | A1 * | 3/2009 | Ellement | E02F 9/0833 |
| | | | | 182/127 |
| 2011/0011675 | A1 | 1/2011 | Ebbenga et al. | |
| 2012/0012423 | A1 * | 1/2012 | Murphy | E06C 9/085 |
| | | | | 182/96 |
| 2018/0327002 | A1 * | 11/2018 | Nasrabad | B61D 23/00 |

* cited by examiner

FIG. 3

DETAIL A
SCALE 5:1

70       70

64

HORIZONTAL COLLAPSING LADDER

CROSS-REFERENCE TO RELATED APPLICATION

This Application is a Section 371 National Stage Application of International Application No. PCT/US2022/011086, filed Jan. 4, 2022 and published as WO 2022/159262 A1 on Jul. 28, 2022, in English, which claims priority to U.S. provisional patent application Ser. No. 63/152,137, filed Feb. 22, 2021, and U.S. provisional patent application Ser. No. 63/139,968, filed Jan. 21, 2021, the contents of which are hereby incorporated by reference in their entirety.

BACKGROUND

When a boat is being launched and the boat and trailer are backed into water, accessibility to the boat is restricted and usually not very easy to accomplish, especially when there is no dock. Boarding ladders of the type commonly provided with boats are typically, designed for access from the water and thus may be located too high for convenient access to a boat on a trailer. However, it is often necessary to climb onto the bow of the boat either before launch or after loading the boat back onto the trailer. It is common to stand on the trailer near the winch, but it is difficult to get onto the bow or nose platform from the trailer without climbing on a ladder.

SUMMARY

An aspect of the present disclosure relates to a collapsible ladder assembly for mounting to a trailer. The ladder assembly includes a ladder portion, a trailer mounting bracket, two extensible arms extending between connection with the ladder portion and connection with the trailer mounting bracket, and a first pivotal connection coupling the ladder portion to each of the two extensible arms and a second pivotal connection coupling the ladder portion to each of the extensible arms. The axis of the first pivotal connection is substantially normal to an axis of the second pivotal connection. A third pivotal connection couples each of the two extensible arms to the trailer mounting bracket.

The ladder portion comprises two opposing side rails and a plurality of rungs extending between the two opposing side rails, wherein the rungs are secured to each side rail via a pivotal connection allowing the ladder portion to collapse reducing the distance between the two opposing side rails.

The opposing side rails each have an open space along a surface facing the opposite side rail and wherein the open space receives the rungs therein when the ladder is collapsed so as to provide a horizontally positioned side rail to the trailer. The assembly further comprising at least one bracket for supporting the first and second pivotal connections.

The ladder portion has a handle connected to one side rail and extending upwardly therefrom for use when the ladder is in an upright, vertical, or open position for use and climbing.

The at least one bracket supporting the first and second pivotal connections couples a lower end of one opposing side rail to connect the opposing side rail to one of the two extensible arms and further comprising a second bracket of the same construction as the at least one bracket for coupling a lower end of the other opposing side rail to connect the other opposing side rail to the second of the two extensible arms.

The two extensible arms each comprise two sleeve portions slidably connected to adjust an overall length of the extensible arms.

The first pivotal connection, second pivotal connection, and third pivotal connection cooperate to move the ladder between a vertical position and a horizontal position with respect to the boat trail to which it is mounted.

The pivotal connections provide a vertical ladder in a first, open position and a running board or step for the trailer in a second, collapsed position.

The ladder is configured for mounting on a port side, starboard side, back portion or front portion of the trailer or combinations thereof without modification to the ladder assembly.

The ladder portion is moveable between the collapsed position and use position without the assistance of tools.

The first and second pivotal connections each comprises a pin for enabling the pivotal connections.

One of the first and second pivotal connections enable pivoting about an axis that is substantially parallel to the axis about which the third pivotal connection is enabled.

Another aspect of the present disclosure relates to a connection mechanism for connecting a collapsible ladder portion to a boat trailer. The connection mechanism includes two extension arms, each arm comprising a first end and a second end wherein the first and second end are slidably connected such that the extension arms have adjustable lengths. Two brackets are provided with each bracket supporting a first pivotal connection between the bracket and the first end of one of the two extension arms, and each bracket supporting a second pivotal connection between the bracket a side rail of the collapsible ladder and two trailer mounting brackets wherein the second end of each extension arm is pivotally coupled to one of the two trailer mounting brackets. The first pivotal connection and second pivotal connection supported by each of the two brackets allow for pivotal movement about different axes.

The connection mechanism is comprised of steel, aluminum, a composite material, lightweight material having a resistance to water damage, or a combination thereof.

The connection mechanism pivotally and rotatably connects a collapsible ladder securely to a boat trailer al lowing the ladder to be opened for use and col lapsed for use as a running board for the boat trailer.

Yet another aspect of the present disclosure relates to a method of securing a collapsible ladder to a boat trailer. The method includes providing a collapsible ladder assembly, the assembly comprising a ladder portion and extensible mounting arms and the assembly further comprising three pivoting joints; and securing at least one mounting bracket to the boat trailer with a first pivoting joint between the mounting bracket and the extensible mounting arms and a second and third pivoting joint between the mounting arms and the collapsible ladder.

The first pivoting joint comprises two pivoting connections for securing the mounting arms to the at least one mounting bracket and wherein each of the second and third pivoting joints also each comprise two pivoting connections for securing a side rail of the ladder to each mounting arm.

A handle portion is provided for the collapsible ladder and wherein moving the handle initiates moving the collapsible ladder between a vertical position for climbing the ladder and a horizontal position for using the ladder as a running board or step.

Yet another aspect of the present disclosure relates to a collapsible ladder assembly for mounting to a trailer where the ladder assembly comprises a trailer mounting bracket and a collapsible ladder portion having first and second side rails and a plurality of ladder rungs extending between the side rails, the collapsible ladder portion being attached to the trailer by the trailer mounting bracket such that the ladder portion may be extended to a ladder climbing position and collapsed to a compacted substantially horizontal position. A handle is attached to one of the side rails for use when the ladder is in the ladder climbing position.

The handle is mounted or otherwise fixed to an upper end of one of the side rails such that when the ladder is extended to the ladder climbing position, the handle extends upwardly therefrom. The handle is mountable to either side rail to enable the collapsible ladder assembly to be mounted for use on a port side, starboard side, back portion or front portion of the trailer or combinations thereof without modification to the ladder assembly.

BRIEF DESCRIPTION OF THE DRAWINGS

FIG. 3 is an exploded view of the collapsible ladder assembly.

DETAILED DESCRIPTION

Figure 1A:
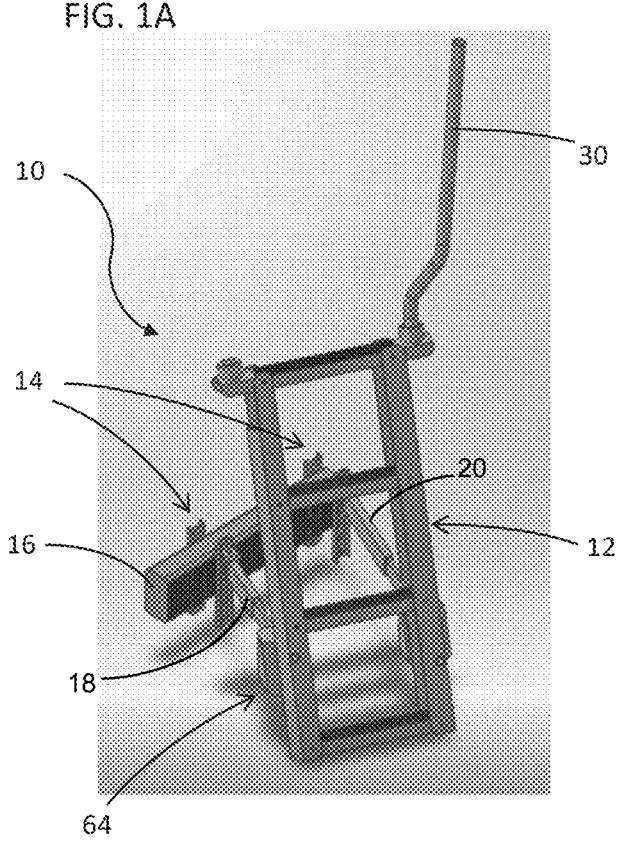
FIGS. 1A-ID are front views of a method of collapsing a collapsible ladder assembly from an open, upright position to a collapsed, horizontal position.
Figure 1B:
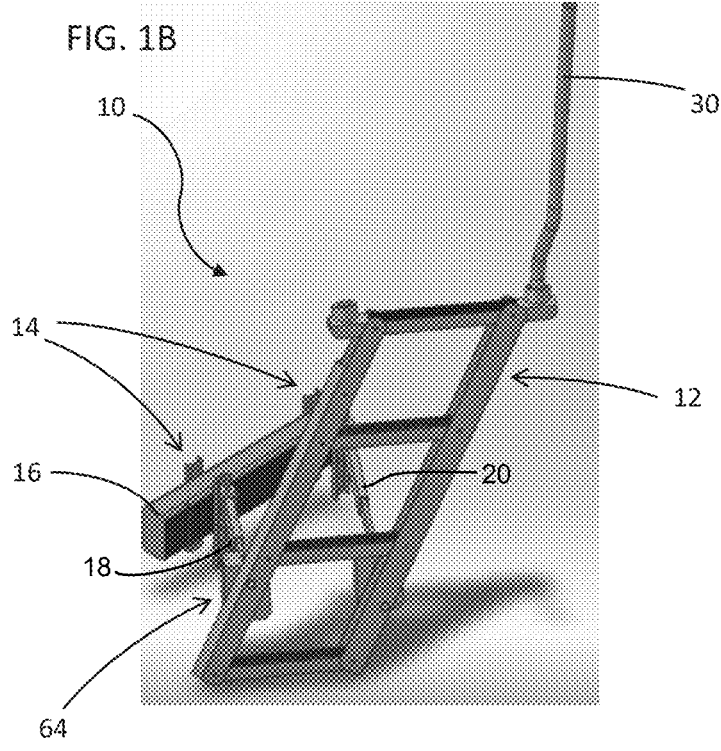
Figure 1C:
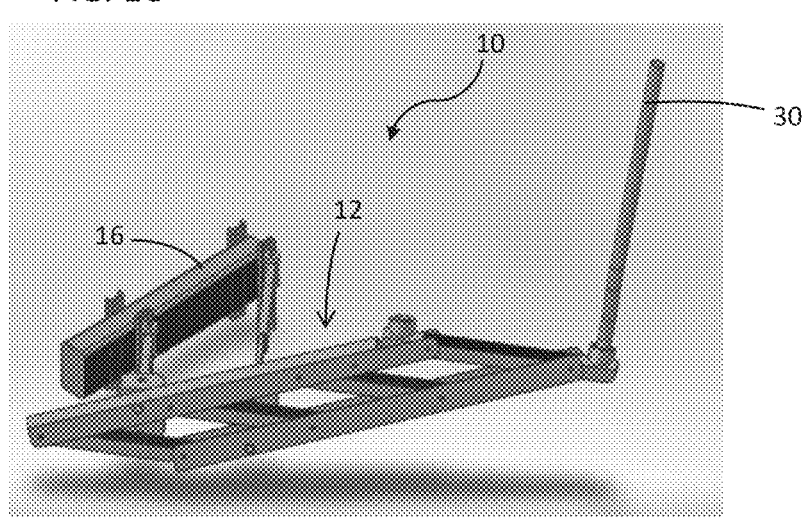
Figure 1D:
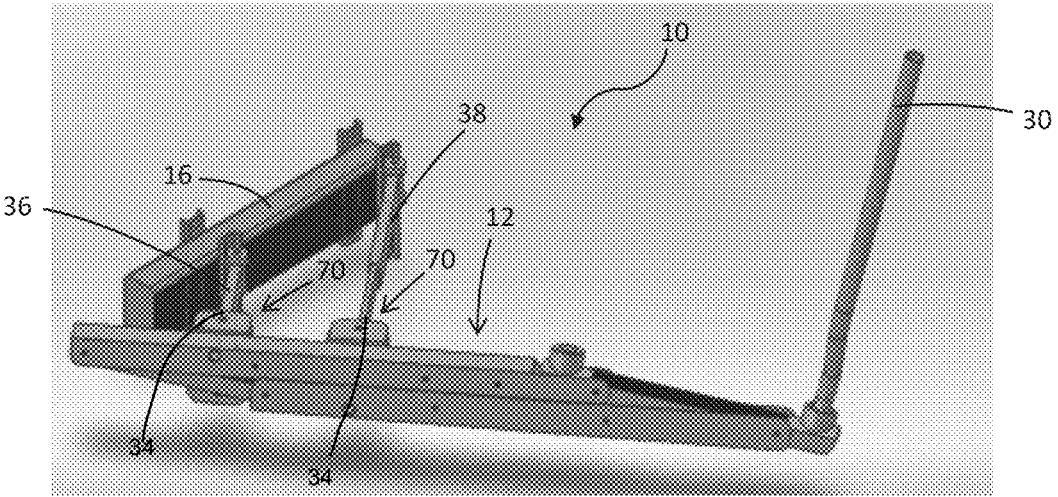
Figure 2A:
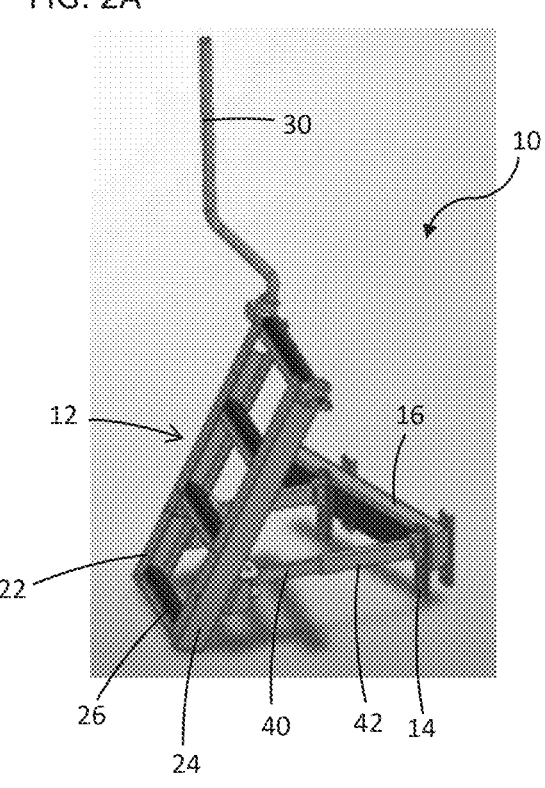
FIG. 2A is a side view of the collapsible ladder assembly in an open, upright position.
Figure 2B:
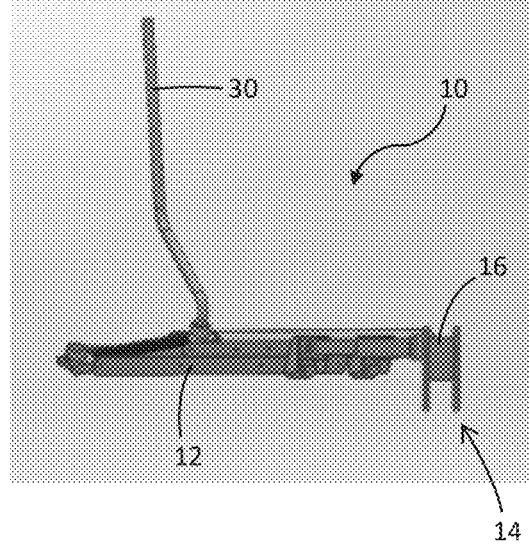
FIG. 2B is a side view of the collapsible ladder assembly in a collapsed, closed position.
Figure 4:
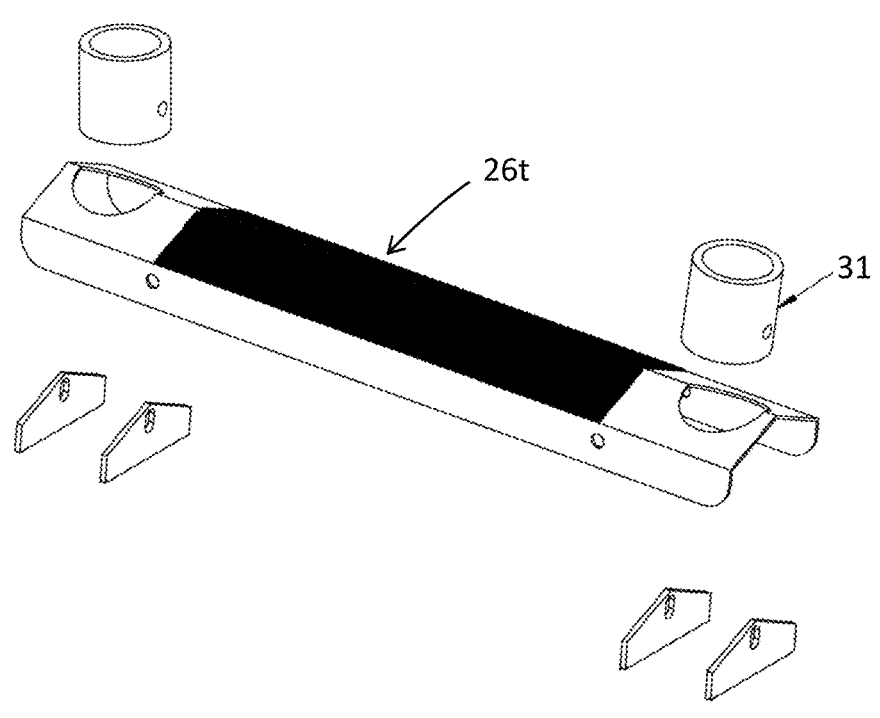
FIG. 4 is an exploded view of a subassembly for a top rung of a ladder portion of the collapsible ladder assembly.
Figure 5:
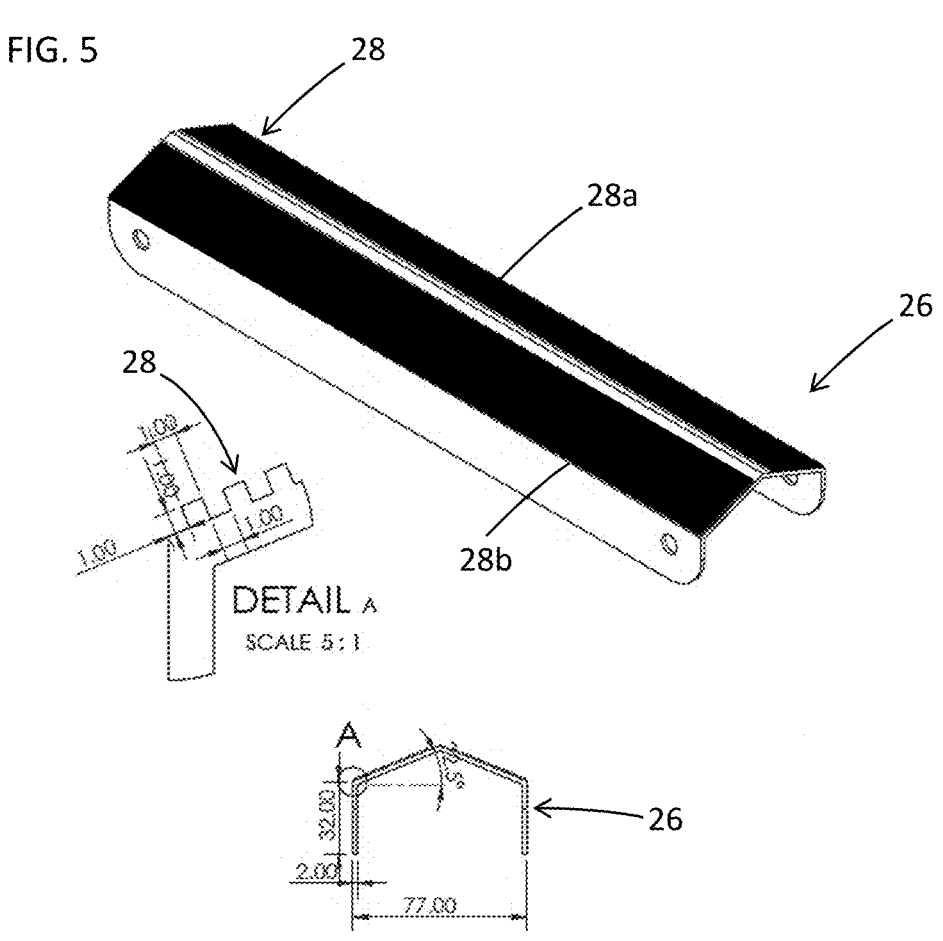
FIG. 5 is a perspective view of a lower rung of the ladder portion.
Figure 6:
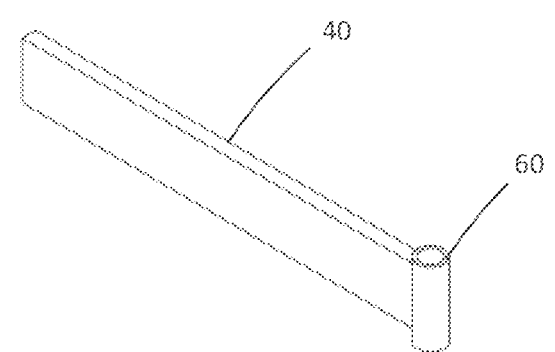
FIG. 6 is a perspective view of a first sleeve of an extension arm of the collapsible ladder assembly.

A collapsible ladder assembly as described herein is mountable to a trailer, for example, the ladder assembly can be securely mounted for use to a vehicle trailer, such as a boat trailer. The ladder assembly may be mounted securely on the trailer, such as at a location allowing bow entry into the boat carried by the trailer. The ladder assembly is also configured such that the ladder assembly can be mounted on the port or starboard side of the boat trailer for example and/or in the front or back of the boat trailer without modification. In a collapsed position the ladder is substantially horizontal with respect to a length of the trailer. When collapsed, the ladder is positioned for storage and/or transport. In the collapsed position, the ladder also doubles as a running board or usable step for the trailer. When opened and in a use position, the ladder portion is a vertical ladder extending above the trailer to allow a user to climb up and into a boat supported on the trailer.

As illustrated in the figures, the collapsible ladder is a ladder assembly 10 that includes a ladder portion 12 and a mounting assembly 14 for operably and fixedly securing the ladder 12 to a device such as a boat trailer 16. The ladder portion 12 and the mounting assembly 14 are connected by at least first and second collapsible attachment mechanisms 18, 20 which allow the ladder portion 12 to collapse from a vertical position for use to a horizontal position for storage. During collapsing of the ladder portion 12 of the assembly 10, the ladder portion 12 also moves closer to the mounting assembly 14 for compact storage and/or use as a running board.

In further detail, the ladder portion 12 comprises at least one side rail 22 and in the embodiment illustrated two opposing side rails 22, 24. The side rails 22 and 24 are parallel to one another. The side rails 22 and 24 are connected by a plurality of horizontal rungs 26 spaced apart along the length of the side rails 22 and 24 to form steps of the ladder. Each rung 26 is pivotally secured on both ends to each side rail 22 and 24 enabling the ladder portion 12 to be collapsible where one or more rungs are collapsed in between the side rails 22 and 24 as illustrated in the figures. The pivotal connection between each rung 26 and the side rails 22 and 24 may comprise coordinating apertures in side plates of the rungs 26 and side plates of the side rails 22 and 24 wherein pivot pins operably and securely couple each step pivotally to the handrails 22 and 24. As shown in the figures, the rungs 26 are pivotally attached to each side rail 22, 24. Each of the side rails 22 and 24 have a hollow area 32 extending along an inside face of the length of the side rail 22, 24 such that the rungs 26 can reside at least partially within the hollow areas 32 to form a compact ladder assembly 10 when the ladder assembly 10 is collapsed. When the ladder is collapsed, for example when, the ladder portion 12 is in a partially collapsed configuration, a distance between the first and second side rails 22 and 24 decreases. The folded configuration is useful for making the ladder portion 12 more compact for storage or transport. Ladder portion 12 can be maintained in the folded configuration by securing with a strap, for example one having facing portions comprising hook and loop fasteners.

In one or more embodiments, a top surface 28 of rungs 26 has two sloping surfaces 28a, 28b where the sloping surfaces 28, 28b are oriented in different directions to allow the ladder portion 12 to remain usable when the ladder system 10 is mounted on either the port or starboard sides of the boat trailer 16. The rungs 26 may each include a non-skid surface, texture or material thereon for added safety and grip.

In the embodiment illustrated one or both side rails 22 and 24 are attached to a handle or handrail portion 30. A top rung 26t is provided with a sleeve 31 on one or both opposing ends of the top rung 26t where a base of the handrail 30 may be inserted and fastened for secured connection of the handrail 30 to the ladder portion 12. Fasteners such as bolts and nuts may be used to secure the handrail to the ladder portion. It is also contemplated that other means such as welding may be used in additional or alternative embodiments. The handrail(s) 30 may be used to collapse and open the ladder assembly 10 and location of the handrail(s) 30 may be selected based on the mounting location of the ladder assembly 10 on the trailer 16 and/or user preference.

The handle or handrail 30 can be comprised of a tubular length having one or more bends for ergonomic use and/or slip prevention. The handle 30 may also be provided with a coated end for grabbing and use or an otherwise textured end to increase friction and grip when in use. The handle or handrail 30 can be mounted to an upper end of one of the side rails 22 or 24 such that when the ladder portion 12 is extended to a vertical, ladder climbing position, the handle 30 extends upwardly therefrom. The ladder portion 12 is configured such that the handle or handrail 30 is mountable to either the first or second side rail 22, 24 to enable the collapsible ladder assembly to be mounted for use on a port side, starboard side, back portion or front portion of the trailer or combinations thereof without modification to the ladder assembly 10.

Figure 3:
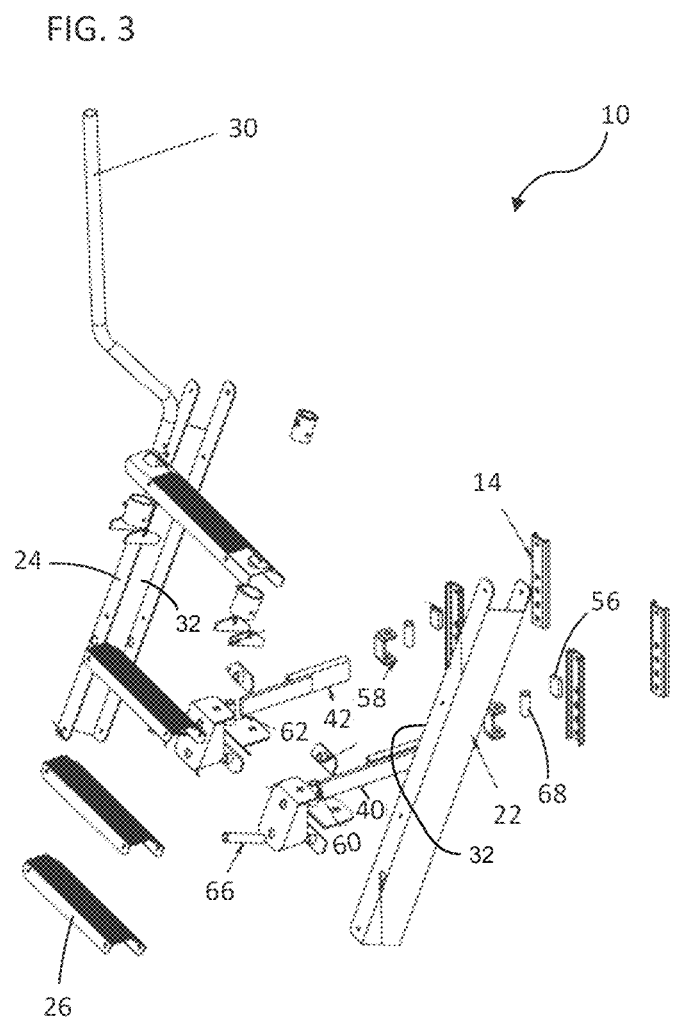
Figure 8:
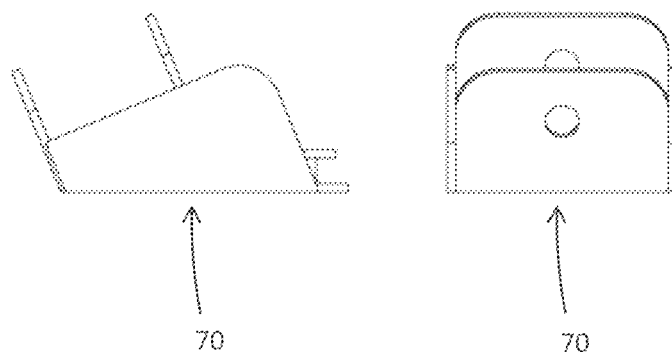
FIG. 8 illustrates a ladder portion mounting bracket of the collapsible ladder assembly.
Figure 9:
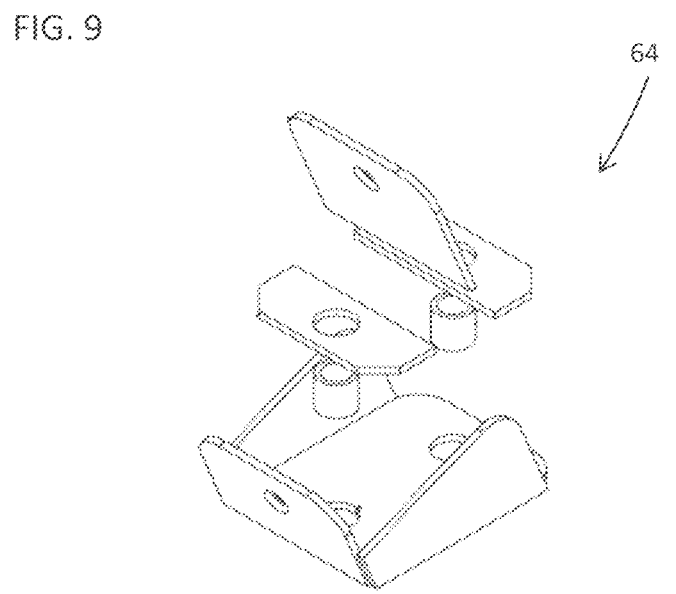
FIG. 9 is an exploded view of a subassembly for the ladder portion mounting bracket of the collapsible ladder assembly.

The ladder assembly 10 has at least three distinct pivoting joints which cooperate to allow the collapsible ladder portion 12 to move smoothly from an upright position to a horizontal position. Mounting assembly 64 is positioned between the ladder portion 12 and attachment members 36, 38 and may provide two distinct pivotal joints. Lower ends 34 of each side rail 22 and 24 of the ladder portion 12 are pivotally and rotatably connected to an attachment member 36, 38, where the attachment members 36, 38 may be considered extensible arms that connect the ladder portion 12 to the trailer 16. The mounting assembly 64 comprises a bracket assembly 70 illustrated in FIGS. 3 and 8-9 supports a first connection and pivoting joint between each side rail 22 and 24 and the bracket 70 where a pivot pin and aperture allow the collapsible ladder to rotate from an upright to a collapsed position in connection with the bracket 70 as described further below. The bracket 70 also supports a second connection and pivoting joint between attachment member 36, 38 via a second pivot pin to allow the attachment members 36, 38 to move such that a distance between ends of the attachment members 36 and 38 connected to each bracket 70 increases or decreases during opening and collapsing of the ladder portion 12 allowing the ladder assembly 10 to self-level and be positionable with respect to the trailer 16.

In further detail, the attachment members 36, 38 each have adjustable lengths. The attachment members 36, 38 may each comprise a first sleeve 40 and a second sleeve 42, where the sleeves are slidably connected to one another such that the sliding of one sleeve 40, 42 with respect to the other sleeve 40, 42 lengthens or shortens an overall length of the attachment member 36, 38. The overall length of the attachment members 36, 38 may be the same or different and the overall lengths adjustable in order to allow the ladder assembly 10 be mounted to trailers 16 of different sizes. When assembled the attachment members 36, 38 may not be parallel as they extend from the bracket 70 to the mounting assembly 14. The length of the attachment members 36, 38 as they extend from the bracket 70 to the mounting assembly 14 is also adjustable and self-adjusts as the ladder assembly 10 is opened and also collapsed.

The first sleeve 40 of each attachment member 36, 38 has a length terminating in a vertically positioned hollow tube 60. The hollow tube 60 is configured to operably connect to or otherwise pivotally receive a front mounting pin 62 of a mounting assembly 64 to allow for pivoting of the ladder portion 12 around a first axis that is vertical with respect to the horizontal axis of the trailer 16 to which the ladder assembly 10 is mounted. It is also at this connection that the spacing or distance between the respective ends of first sleeve 40 of members 36 and 36 may change as the ladder assembly 12 is opened or collapsed which contributes to the self-leveling of the assembly 10.

Each mounting assembly 64 further comprises a ladder aperture for operably receiving a side mounting pin 66 therethrough for rotatably and/or pivotally connecting the ladder portion 12 and attachment members 36, 38 to the mounting assembly 64. The side mounting pin 66 may be oriented in a position substantially normal or perpendicular to the front mounting pin such that the ladder portion can rotate about this connection to collapse the ladder from a vertical position to a horizontal position or vice versa.

The second sleeve 42 of each attachment member 36, 38 is configured at a first end to enable the sliding connection of the first sleeve 40 and second sleeve 42 and on a second opposing end of the second sleeve 42 is configured with a bracket pin 68. The bracket pin 68 connects the second sleeve 42 to the trailer mounting assembly 14. The bracket pin 68 is pivotally coupled to the mounting assembly 14 such that the second sleeve 42 is then pivotally secured to the mounting assembly 14 allowing the attachment members 36, 38 to pivot above an axis that may be vertical with respect to the length of the trailer 16 to which it is mounted. Each attachment member 36, 38 may have a pivoting joint at each ends of the member 36, 38.

The arms or attachment members 36, 38 are spaced apart and extend from pivotal connection with the mounting assembly 14 to the pivotal and/or rotatable connection with the ladder portion 12. The attachment members 36, 38 may not be parallel, nor the same length, and are independently adjustable in length as the arms extend between the mounting assembly 14 and the ladder portion 12 to aid in the self-leveling of the ladder portion 12 when in use.

Figure 7:
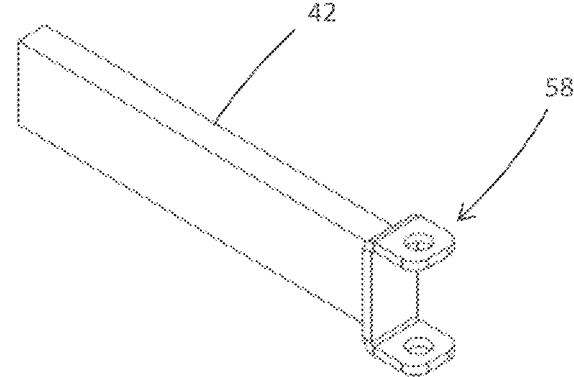
FIG. 7 is a perspective view of a second sleeve of an extension arm of the collapsible ladder assembly.
Figure 10:
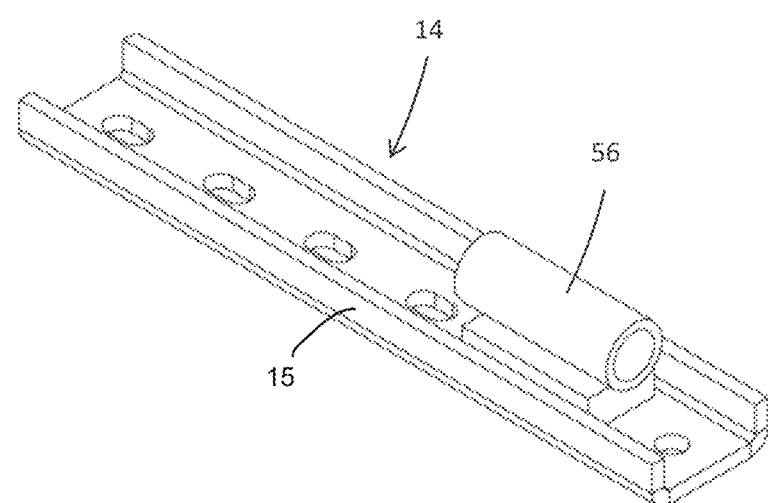
FIG. 10 illustrates a trailer mounting bracket for the ladder assembly.

Referring to FIG. 10, the mounting assembly 14 comprises one or more brackets 15 that are also configured for and provided with a fastening means for securing the mounting assembly 14 to the trailer 16, such as a nut and bolt system. As illustrated, a pivoting joint is formed by the pivotal connection between the arm 38 illustrated in FIG. 7 and pivot tube 56 secured to the bracket 15. The pivot pin 68 is inserted into pivot tube 56 where the pivot pin 68 is secured to a terminal end 58 of arm 38.

A common type of boat trailer 16 (not shown) includes a frame with a longitudinal member terminating at a tongue mounting for a hitch (not shown). In one embodiment, a bolt plate cooperates with bolts and fastening strips about a longitudinal member; thus, no structural modification of the trailer 16 is needed for the use or repositioning of ladder assembly 10.

The mounting assembly 14 has sufficient strength and is securely fastened to the trailer to support a user climbing the ladder 12 when the ladder assembly 10 is in an open, use position.

The ladder assembly 10 is collapsible when secured to a trailer 16 by way of cooperation between the pivotal attachment of the rungs 26 to each side rail 22 and 24 and the pivotal connection of the side rails 22 and 24 to each collapsible attachment mechanism 36, 38 and the pivotal connection of each collapsible attachment mechanism 36, 38 to the mounting assembly 14. The ladder assembly 10 is a self-leveling ladder assembly 10 and as the ladder assembly 10 is opened for use, the ladder portion 12 will self-level with respect to the ground surface where the trailer 16 is supported.

The ladder assembly 10 described herein offers the user increased comfort, safety, and convenience. Once ladder assembly 10 is securely installed on trailer 16, the position of the ladder portion 12 is easily and quickly adjustable relative to the trailer 16 and watercraft, without requiring the use of tools, for optimal use with any combination of trailer 16 and a vehicle (not shown), such as a watercraft. A rotational orientation of the ladder portion 12 with respect to the trailer 16 is infinitely adjustable by simply pulling on a side rail 22, 24 or more preferably, a handrail 30 to move the ladder assembly 10. Moreover, a locking system may be provided to secure the ladder in the open and/or closed position. The locking system may comprise one or more clamping assemblies installed at one or more of the pivotal connections, for example, the pivoting and/or rotating mechanism between the ladder portion 12 and the attachment mechanisms 36, 38 may be lockable by way of a spring bias, clamping mechanism, pneumatic assembly, or a combination thereof.

Although the present disclosure has been described with reference to preferred embodiments, workers skilled in the art will recognize that changes may be made in form and detail without departing from the spirit and scope of the disclosure.

The invention claimed is:

1. A collapsible ladder assembly for mounting to a trailer, the ladder assembly comprising:
    a ladder portion comprising two opposing side rails;
    a trailer mounting bracket;
    two extensible arms extending between a connection with the ladder portion and
        a connection with the trailer mounting bracket; and
    a first pivotal connection coupling the ladder portion to each of the two extensible arms;
    a second pivotal connection coupling the ladder portion to each of the extensible arms, wherein an axis of the first pivotal connection is substantially normal to an axis of the second pivotal connection;
    first and second brackets for supporting the first and second pivotal connections; and
    a third pivotal connection coupling each of the two extensible arms to the trailer mounting bracket,
    wherein the first bracket couples a lower end of one opposing side rail to connect the lower end of the opposing side rail to one of the two extensible arms, and the second bracket couples a lower end of the other opposing side rail to connect the other opposing side rail to the second of the two extensible arms.

2. The collapsible ladder assembly of claim 1 wherein the ladder portion further comprises a plurality of rungs extending between the two opposing side rails, wherein the rungs are secured to each side rail via a pivotal connection allowing the ladder portion to collapse reducing the distance between the two opposing side rails.

3. The collapsible ladder assembly of claim 2 wherein the opposing side rails each have an open space along a surface facing the opposite side rail and wherein the open space receives the rungs therein when the ladder is collapsed so as to provide a horizontally positioned side rail to the trailer.

4. The collapsible ladder assembly of claim 1 wherein the two extensible arms each comprise two sleeve portions slidably connected to adjust an overall length of the extensible arms.

5. The collapsible ladder assembly of claim 1 wherein the first pivotal connection, second pivotal connection, and third pivotal connection cooperate to move the ladder between a vertical position and a horizontal position with respect to the trailer to which it is mounted.

6. The collapsible ladder assembly of claim 1 wherein the pivotal connections provide a vertical ladder in a first, open position and a running board or step for the trailer in a second, collapsed position.

7. The collapsible ladder assembly of claim 1 wherein the ladder is configured for mounting on a port side, starboard side, back portion or front portion of the trailer without modification to the ladder assembly.

8. The collapsible ladder assembly of claim 1 wherein the ladder portion is moveable between the collapsed position and use position without the assistance of tools.

9. The collapsible ladder assembly of claim 1 wherein the first and second pivotal connections each comprises a pin for enabling the pivotal connections.

10. The collapsible ladder assembly of claim 1 wherein one of the first and second pivotal connections enable pivoting about an axis that is substantially parallel to the axis about which the third pivotal connection is enabled.

11. The collapsible ladder assembly of claim 2 and further comprising a handle connected to one of the side rails.

12. A connection mechanism for connecting a collapsible ladder portion to a boat trailer, the connection mechanism comprising:
    two extension arms, each arm comprising a first end and a second end wherein the first and second end are slidably connected such that the extension arms have adjustable lengths;
    two brackets, each bracket supporting a first pivotal connection between the respective bracket and the first end of one of the two extension arms, and each bracket supporting a second pivotal connection between the bracket and a lower end of a side rail of the collapsible ladder to couple the two extension arms to the collapsible ladder;
    two trailer mounting brackets wherein the second end of each extension arm is pivotally coupled to one of the two trailer mounting brackets to couple the two extension arms to the trailer; and
    wherein the first pivotal connection and second pivotal connection supported by each of the two brackets allow for pivotal movement of the ladder coupled to the trailer about different axes.

13. The connection mechanism of claim 12 wherein the connection mechanism is comprised of steel, aluminum, a composite, or a combination thereof.

14. The connection mechanism of claim 12 wherein the connection mechanism pivotally and rotatably connects a collapsible ladder securely to a boat trailer allowing the ladder to be opened for use and collapsed for use as a running board for the boat trailer.

15. A method of securing a collapsible ladder to a boat trailer comprising:
    providing a collapsible ladder assembly, the assembly comprising a ladder portion and extensible mounting arms and the assembly further comprising three pivoting joints; and
    securing at least one mounting bracket to the boat trailer with a first pivoting joint between the mounting bracket and the extensible mounting arms, and a second and third pivoting joint between the mounting arms and lower ends of each opposing side rail of the collapsible ladder.

16. The method of claim 15 wherein the first pivoting joint comprises two pivoting connections for securing the mounting arms to the at least one mounting bracket and wherein each of the second and third pivoting joints also each comprise two pivoting connections for securing a side rail of the ladder to each mounting arm.

17. The method of claim 15 and further comprising providing a handle portion for the collapsible ladder and wherein moving the handle initiates moving the collapsible ladder between a vertical position for climbing the ladder and a horizontal position for using the ladder as a running board or step.

\* \* \* \* \*